UNITED STATES PATENT OFFICE.

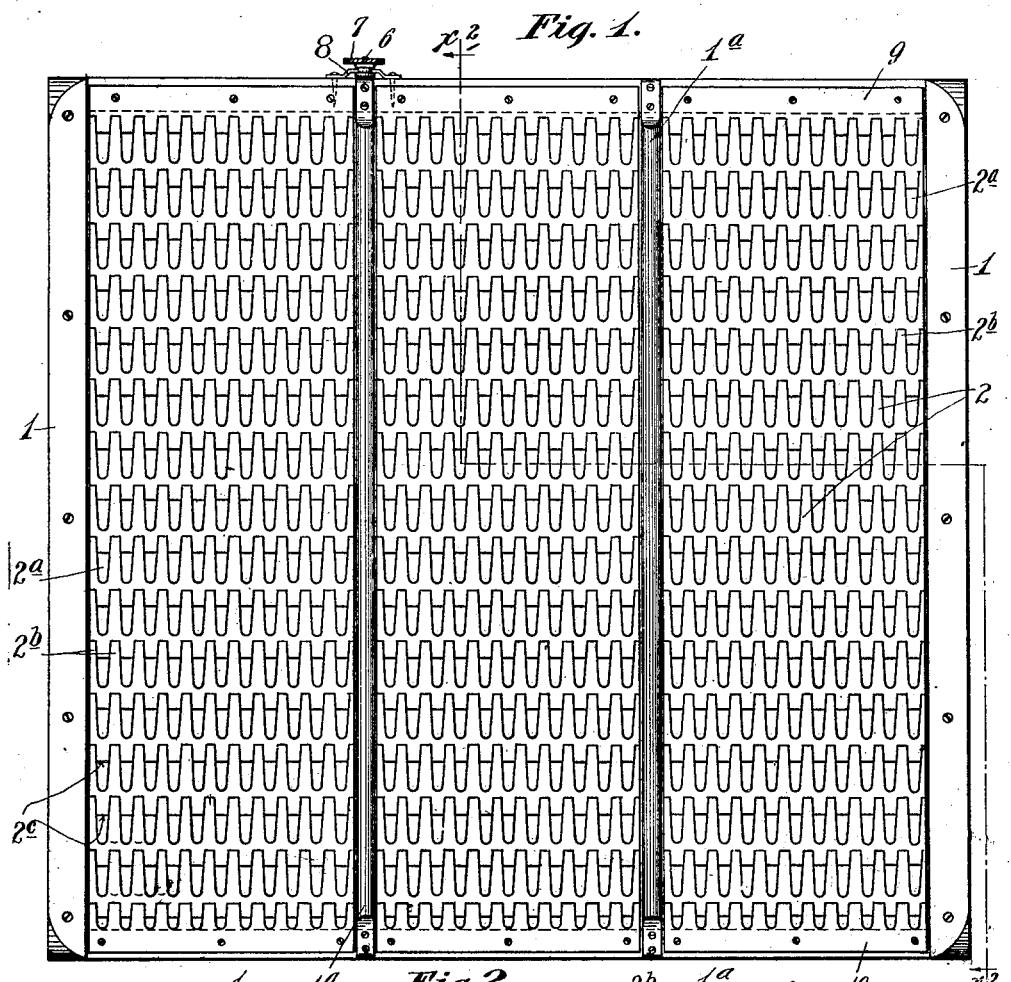
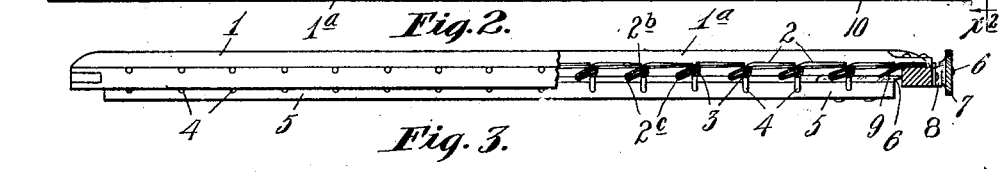
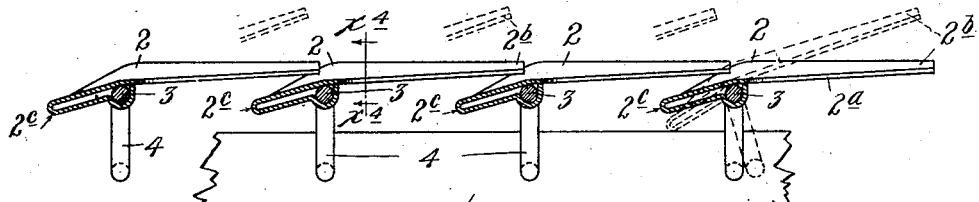
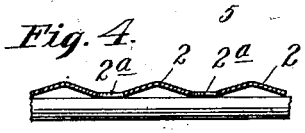

CHARLES CLOSZ, OF WEBSTER CITY, IOWA.

ADJUSTABLE SIEVE.

No. 925,623.　　　　Specification of Letters Patent.　　　　Patented June 22, 1909.

Application filed December 29, 1905. Serial No. 293,738.

*To all whom it may concern:*

Be it known that I, CHARLES CLOSZ, a citizen of the United States, residing at Webster City, in the county of Hamilton and State of Iowa, have invented certain new and useful Improvements in Adjustable Sieves; and I do hereby declare the following to be a full, clear, and exact description of the invention, such as will enable others skilled in the art to which it appertains to make and use the same.

My present invention relates to that class of sieves which are made up of overlapped sheet metal sections, and has for its object to improve the same in the several particulars hereinafter noted.

A sieve of the general character above indicated is disclosed and claimed in my prior patent No. 698,258, of date April 22, 1902.

The sieve herein illustrated and claimed is especially designed for use in separating corn from broken pieces of cob, husks and corn silks.

The improved sieve will be first described in detail and the important features of the invention will then be described and particularly noted.

The invention is illustrated in the accompanying drawings, wherein like characters indicate like parts throughout the several views.

Figure 1 is a plan view showing a sieve embodying the features of my invention. Fig. 2 is a view partly in side elevation and partly in section on the irregular line $x^2$ $x^2$ of Fig. 1, showing the improved sieve. Fig. 3 is an enlarged sectional view also taken on the line $x^2$ $x^2$ of Fig. 1, some parts being broken away; and Fig. 4 is a detail in section on the line $x^4$ $x^4$ of Fig. 3.

The numeral 1 indicates the rectangular supporting frame of the sieve.

The numeral 2 indicates, as entireties, the metallic slats or sieve sections, which sections are independently secured to rock shafts 3, mounted in the sides and in the intermediate bars $1^a$ of the frame 1. The rock shafts 3 are provided with depending crankarms 4 that are connected by a common push bar 5. The push bar 5 is loosely connected to one end of a thrust rod 6, the outer end of which is threaded and is engaged by a nut 7 swiveled to the front bar of the frame 1, by means of clips 8.

The metallic slats 2 extend transversely of the line of travel of the stock and are corrugated, and between the ridges of the corrugations are formed with long forwardly diverging notches $2^a$ that extend from their forward edges back a very considerable distance, preferably to, or almost to their rock shafts 3. The diverging notches cut the forward portions of the slats 2 into a plurality of forwardly tapered fingers $2^b$; and the fingers $2^b$ of the several bars aline with each other in the direction of travel of the stock and form a plurality of channels between them, that extend from the front to rear of the sieve.

The forward ends of the fingers $2^b$, it will be noted, (see Fig. 3) terminate directly over and, in fact, slightly overlap with the raised portions of adjacent fingers $2^b$ that are alined therewith, just ahead or in front thereof. Hence, the several longitudinally alined raised finger portions form substantially continuous ribs in the direction of the travel of the stock over the sieve.

Those portions $2^c$ of the slats 2 that extend rearward of the respective rock shafts are imperforate and are bent downward at an angle with respect to the planes of the corresponding finger portions $2^b$. To the front and rear transverse bars respectively of the sieve frame 1 are rigidly secured metallic slats 9 and 10 that are corrugated and notched to correspond to the movable slats 2.

One of the principal features of novelty in the construction and arrangement of the sieve herein described and claimed is found in the fact that the notches $2^a$ of the overlapping sieve slats extend backward beyond the rear edges of the slats which they overlap, so that corn or other grain may freely fall directly and vertically through the sieve opening afforded thereby. More specifically stated, the finger portions $2^a$ overlap the inclined rear portions $2^c$ of adjacent slats, and their notches $2^a$ extend rearward of the rear edges of the said portions $2^c$, so that unobstructed passages through the sieve, made up of the overlapped slats, are provided.

In the sieve herein illustrated, which is especially designed for the separation of corn from broken pieces of corn cob, corn husks, corn silks and such foreign materials, the fingers $2^b$ are caused to overlap the adjacent slats approximately to the axis of their rock shafts 3, so that the slats $2^a$ extend approximately from the one rock shaft to adjacent rock shafts, thereby affording longitudinally extended meshes of the greatest possible length. These long meshes are very desirable in a sieve intended for use to separate corn from foreign materials, such as those noted. As is evident, by adjustments of the swiveled nut 7, the push bar 5 may be moved endwise, and the several rock shafts may be simultaneously rocked, so as to raise and lower the free ends of the fingers $2^a$, to adapt the screen for different kinds of work. For instance, large corn will require the slats 2 to be rocked so as to carry their fingers $2^a$ into elevated or inclined positions. For small corn, the slat fingers $2^a$ should be turned approximately into the horizontal positions shown by full lines in Fig. 3. When the parts are thus adjusted, the rearwardly inclined portions $2^c$ of the slats have effected the closing, to a certain extent, of the forward portions of the notches $2^a$, thereby shortening the said notches. But, when the said sections 2 are adjusted, as shown by dotted lines in Fig. 3, the meshes afforded by the notches $2^a$ are increased in length to a maximum, and by virtue of the greater inclination of the slat portions $2^c$, the discharge of any material falling thereon will be accelerated. The continuous channels formed between the fingers $2^b$ of the several slats, permit the rapid travel of the foreign materials, such as broken corn cobs, corn husks and corn silks. The longitudinally alined prongs $2^b$ form approximately continuous ribs upon which the coarse materials ride freely, and by which said coarse materials are held, to a very considerable extent, at least, out of contact with the kernels of corn that ride in the said channels.

The sieve described has, in practice, been found extremely efficient for the purposes had in view. The sieve described, while especially designed for the separation of corn, may, of course, be used for the separation of various other materials, for which purpose the dimensions and proportions of certain of the parts may, of course, be varied.

What I claim and desire to secure by Letters Patent of the United States, is as follows:

In a sieve, the combination with a multiplicity of parallel rock shafts and means for adjusting the same, of a multiplicity of pivotally mounted overlapping sheet metal slats formed with notches and intervening fingers at their forward edges, which fingers are alined in rows and transversely corrugated approximately their entire width to form ridges and intervening channels which extend forward approximately to the pivots of adjacent slats and overlap the ridges of said adjacent slats, said rows of fingers and channels extending in the direction of the travel of the stock over the sieve, and the said notches extending approximately to the pivots of the slats and forming openings in said channels, substantially as described.

In testimony whereof I affix my signature in presence of two witnesses.

CHARLES CLOSZ.

Witnesses:
MALIE HOEL,
F. D. MERCHANT.